US008174360B2

(12) United States Patent
Finkenzeller

(10) Patent No.: US 8,174,360 B2
(45) Date of Patent: May 8, 2012

(54) COMMUNICATION APPARATUS FOR SETTING UP A DATA CONNECTION BETWEEN INTELLIGENT DEVICES

(75) Inventor: Klaus Finkenzeller, Unterföhring (DE)

(73) Assignee: Giesecke & Devrient GmbH, Munich (DE)

( * ) Notice: Subject to any disclaimer, the term of this patent is extended or adjusted under 35 U.S.C. 154(b) by 1131 days.

(21) Appl. No.: 10/565,732

(22) PCT Filed: Jul. 29, 2004

(86) PCT No.: PCT/EP2004/008537
§ 371 (c)(1),
(2), (4) Date: Jun. 30, 2006

(87) PCT Pub. No.: WO2005/013506
PCT Pub. Date: Feb. 10, 2005

(65) Prior Publication Data
US 2006/0244630 A1 Nov. 2, 2006

(30) Foreign Application Priority Data
Jul. 30, 2003 (DE) .................................. 103 34 765

(51) Int. Cl.
H04Q 5/22 (2006.01)
(52) U.S. Cl. ................ 340/10.1; 340/539.23; 340/686.6; 340/658; 340/13.2
(58) Field of Classification Search ........ 340/10.1–10.6, 340/539.23, 686.6, 658, 13.2, 101; 455/41.1, 455/106
See application file for complete search history.

(56) References Cited

U.S. PATENT DOCUMENTS

| 5,287,112 | A | * | 2/1994 | Schuermann | 342/42 |
| 5,319,569 | A | * | 6/1994 | Nichols et al. | 702/199 |
| 5,489,908 | A | * | 2/1996 | Orthmann et al. | 340/10.32 |
| 5,491,715 | A | * | 2/1996 | Flaxl | 375/344 |
| 5,790,946 | A | * | 8/1998 | Rotzoll | 455/343.1 |
| 6,317,027 | B1 | * | 11/2001 | Watkins | 340/10.1 |
| 6,353,406 | B1 | * | 3/2002 | Lanzl et al. | 342/118 |

(Continued)

FOREIGN PATENT DOCUMENTS
DE 34 12 610 10/1985
(Continued)

Primary Examiner — Daniel Wu
Assistant Examiner — Nay Tun
(74) Attorney, Agent, or Firm — Bacon & Thomas, PLLC

(57) ABSTRACT

The invention relates to a communication apparatus for automatically setting up a data connection between two intelligent devices (10, 20, 30). The apparatus comprises a coil (13, 23, 33) for carrying out a contactless data exchange which is part of a transmission oscillator (50), a communication element (12, 22) which is connected to the coil (13, 23, 33) and the data processing component (11, 21) of an intelligent device (10, 20, 30) and emits search signals via the coil (13, 23, 33) to receive a response from another intelligent device (10, 20, 30), a measuring device (14, 24) for monitoring a property of the transmission oscillator (50), which outputs a control signal when ascertaining a change in the monitored property, and a switching apparatus (15, 25) which is connected to the measuring device (14, 24) and the communication element (12, 22) and which switches on the communication element (12, 22) when it has received a control signal from the measuring device (14, 24).

17 Claims, 6 Drawing Sheets

U.S. PATENT DOCUMENTS

| | | | | |
|---|---|---|---|---|
| 6,476,708 B1 * | 11/2002 | Johnson | ...................... | 340/10.34 |
| 6,593,845 B1 * | 7/2003 | Friedman et al. | .......... | 340/10.33 |
| 6,894,572 B2 * | 5/2005 | Heide et al. | ..................... | 331/74 |
| 6,905,074 B2 * | 6/2005 | Charrat | ......................... | 235/492 |
| 7,209,014 B2 * | 4/2007 | Finkenzeller et al. | .. | 331/117 FE |
| 2002/0149376 A1 * | 10/2002 | Haffner et al. | ................. | 324/635 |
| 2005/0156752 A1 | 7/2005 | Finkenzeller et al. | | |

FOREIGN PATENT DOCUMENTS

| | | |
|---|---|---|
| DE | 198 55 207 | 5/2000 |
| DE | 102 06 676 | 8/2003 |
| EP | 0 696 011 | 2/1996 |
| EP | 1 024 451 | 8/2000 |
| WO | WO 03052672 A1 * | 6/2003 |

* cited by examiner

COMMUNICATION APPARATUS FOR SETTING UP A DATA CONNECTION BETWEEN INTELLIGENT DEVICES

BACKGROUND

This invention relates to the use of communication elements automatically setting up a data connection in intelligent devices designed for carrying out a data transmission, the data connection set-up being triggered by the approach of two intelligent devices. A concept for automatically setting up a data connection between intelligent devices is known from the specification ECMA/TC32/TG19/2003/12 under the name of "Near Field Communication" (NFC). The purpose of the concept is to make the set-up of a data connection between intelligent devices as simple as possible. The concept provides for two intelligent devices both designed for carrying out an NFC protocol automatically setting up a data connection when they come together at a distance of typically less than 0.2 meters. In a search mode one of the intelligent devices, the initiator, sends a search query which is answered by the second intelligent device, the target. In an immediately following data exchange the two intelligent devices agree on a data transmission mode according to which a data exchange is then effected between the data processing components of the intelligent devices involved.

Detection of whether another intelligent device is located within the response range of the NFC protocol is done in the search mode by cyclically emitting search queries. The parameters provided for the search queries are a transmitting frequency of 13.56 MHz and a magnetic field strength of at least 1.5 A/m up to a maximum of 7.5 A/m. The provided minimum field strength causes a relatively high constant power consumption in intelligent devices ready to carry out an NFC protocol. For devices with limited energy resources, especially for battery-operated devices, this results in a reduction of the possible service life. To reduce this undesirable effect, it can be provided to equip the intelligent devices with a switching device to be actuated by the user for activating the search mode of an NFC unit. However, this possibility at least partly cancels out the goal of particular ease of operation aimed at by the NFC concept, since at least the switching function must be actuated separately.

The standards ISO/IEC 14443 and ISO/IEC 15693 describe a method in which a reading device tries to produce a data connection with another intelligent device (contactless chip card/RFID transponder). For this purpose, the reading device emits a search signal—REQUEST—periodically with high field strength (e.g. 1.5-7.5 A/m according to ISO/IEC 14443) until an intelligent device comes into the response range of the reading device.

German patent application DE 102 06 676 discloses a switching apparatus to be actuated with a transponder, which can be operated almost non-dissipatively as long as no switching process is triggered. The device to be switched has for this purpose a coil which is part of an oscillating circuit which is operated as a substantially unloaded pure oscillating circuit in the detection mode. The resonant frequency tuned in the oscillating circuit is monitored by a frequency observer. When a transponder with a transponder coil is brought close to the detection coil, the resonant frequency of the oscillating circuit changes. This is detected by the frequency observer, which thereupon produces a switching signal which switches on the device to be switched. The proposed solution focuses on the direct change from detection mode to data transmission mode, i.e. on the direct, single-stage switch-on of an intelligent device by means of a coil support which serves primarily as a switching component.

SUMMARY

The problem of the invention is to specify a communication apparatus for intelligent devices designed for automatic data connection set-up, which has minimal energy consumption without restricting the ease of use.

This problem is solved by an apparatus having the features as discussed herein. The inventive communication apparatus has a communication element with a coil for emitting search signals, whereby the search signal mode is only commenced when a property change in a transmission oscillator set up by means of the same coil has been detected by means of a measuring device. Since transmission oscillator and measuring device can be operated almost non-dissipatively, the output of search signals for detecting the presence of corresponding intelligent devices must only be effected when a further intelligent device is possibly located within the response range of the coil. The energy requirement of the communication apparatus can thus be considerably reduced. The inventive solution is therefore in particular also suitable for intelligent devices with limited energy resources, e.g. for battery-operated devices. It is particularly advantageous that an intelligent device equipped with an inventive communication apparatus can be handled just the same as if the device permanently emitted search queries. No special actions by a user are required. Advantageously, the use of an inventive communication apparatus also does not require any intervention in the execution of the data connection set-up after detection of a further intelligent device present.

In an advantageous development, it is provided that for carrying out a data transmission after the communication element is switched on an ohmic resistor is switched to the oscillating circuit to thereby increase the bandwidth of the transmission oscillator while reducing the quality factor.

In a further advantageous development of the communication apparatus, it is provided to influence the oscillating circuit in such a way that the resonant frequency changes by connecting suitable components after the communication element is switched on. This additionally ensures that other intelligent devices designed for automatic data connection set-up in the same way are not disturbed by a search mode.

In a further advantageous embodiment of the inventive communication apparatus, it is provided that the measuring device is put into operation only periodically. This permits the energy consumption of the communication apparatus to be reduced further. For realizing the periodic putting into operation, the communication apparatus expediently has a time controller, and a measurement result is evaluated by comparison with an average value obtained from preceding measurements.

The measuring device preferably has two oscillator devices for producing oscillation signals, one such oscillator device being coupled with the coil. Further, the measuring device can have circuit components for producing the control signal for the switching apparatus on the basis of a phase relation between said oscillation signals or signals derived therefrom. This permits very precise monitoring of the transmission oscillator to be obtained with comparatively little effort, and the presence of a further device within the response range of the coil to be reliably ascertained in this way.

BRIEF DESCRIPTION OF THE DRAWINGS

An embodiment of the invention will hereinafter be explained in more detail with reference to the drawing, in which.

DETAILED DESCRIPTION

Figure 1:
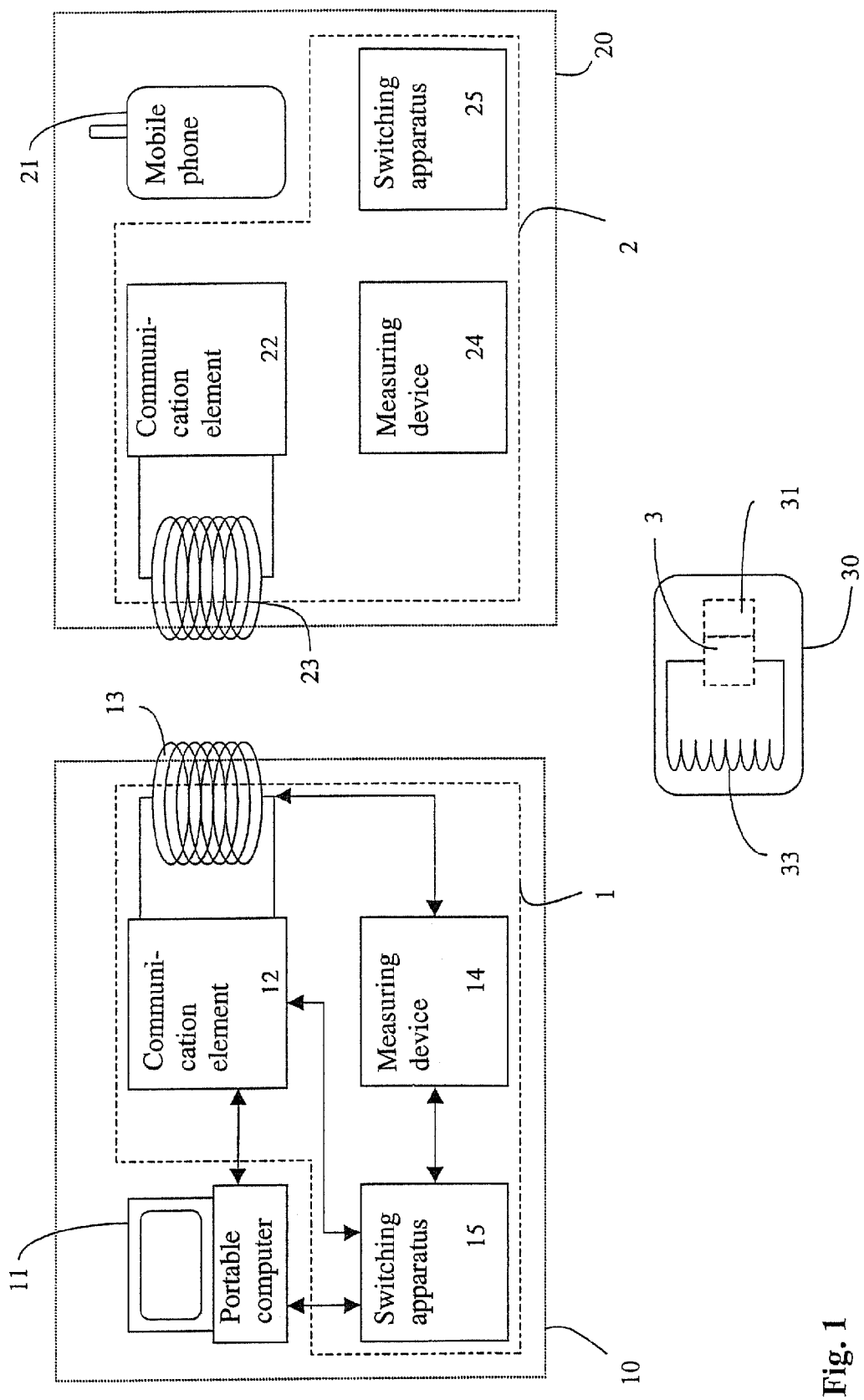
FIG. 1 shows the structure and arrangement of intelligent devices designed for automatic data connection set-up.

FIG. 1 shows intelligent devices 10, 20, 30 in different embodiments. All are designed to conduct a data exchange with one of the other intelligent devices 10, 20, 30 via a coil 13, 23, 33. All intelligent devices 10, 20, 30 referred hereinafter simply as devices have fundamentally the same kind of structure and consist of a data processing component 11, 21, 31 and a communication apparatus 1, 2, 3.

The data processing component 11, 21, 31 substantially brings about the intelligence of the devices 10, 20, 30 and comprises a central processor unit for executing data processing operations. The data processing component 11, 21, 31 moreover substantially determines the outer form of the devices 10, 20, 30. As indicated in FIG. 1, the device 10, 20, 30 can have e.g. the form of a portable computer 11 or a mobile telephone 21 or be realized in an RFID transponder with a chip 31, formed e.g. in a contactless chip card 30. The enumeration of possible forms of design is not final here. Besides those shown, the device 10, 20, 30 can likewise be realized e.g. in an article of daily use, such as a wrist watch, or a garment, such as a jacket, provided with electronic components, but also constitute a firmly installed reading device in a ticketing or access system.

The communication apparatus 1, 2, 3 comprises in each case a communication element 12, 22, a coil 13, 23, 33 connected to the communication element 12, 22, a measuring device 14, 24, connected to the coil 13, 23, 33, and a switching apparatus 15, 25 connected to the data processing component 11, 21, the communication element 12, 22 and the measuring device 14, 24. In practical implementation, the communication apparatus 1, 2, 3 is formed as a rule as one structural unit with the data processing component 11, 21 and is thus located e.g. in the housing of a portable computer 11, a mobile telephone 21 or is integrated in the chip 31 of a chip card 30.

The function of the communication element 12, 22 is to ascertain the presence of another device 10, 20, 30 within the response range of the coil 13, 23, 33. The communication element 12, 22 has means for executing software program routines and can be formed as an independent assembly. When another device 10, 20, 30 has been detected, the communication element 12, 22 further automatically sets up a data connection thereto and produces the data transmission mode for a subsequent data exchange between the particular data-processing components 11, 21, 31. In a particularly expedient embodiment, the communication element 12, 22 is designed to execute an NFC protocol as described in the stated publication ECMA/TC32-TG19/2003/12, or a contactless transmission protocol as described e.g. in the standards ISO/IEC 14443, ISO/IEC 15699 and ISO/IEC 18000-3.

The coil 13, 23, 33 is of the usual design and serves in the way known in the art to carry out a contactless data exchange with a corresponding device 10, 20, 30. As a rule, it is an integrated part of the device 10, 20, 30, as indicated in the execution as a chip card 30. Within the communication apparatus 1, 2, 3 the coil 13, 23, 33 is part of a transmission oscillator 50 with a defined, characteristic resonant frequency which can depend on the operating state of the device 10, 20, 30.

The measuring device 14, 24 is connected to the coil 13, 23, 33 and detects a property of the transmission oscillator 50 formed with the coil 13, 23, 33. It can in particular be of the type as described in the stated German patent application DE 102 06 676.

The switching apparatus 15, 25 serves to switch on and off the communication element 12, 22 and the measuring device 14, 24. The switching on and off of one or both components 12, 22 or 14, 24 can be done indirectly via the data processing component 11, 21. The switching apparatus 15, 25 serves further to connect and disconnect single elements of the measuring device 14, 24. Furthermore, the switching apparatus 15, 25 can be used to switch other components (not shown) of a device 10, 20, 30.

Figure 2:
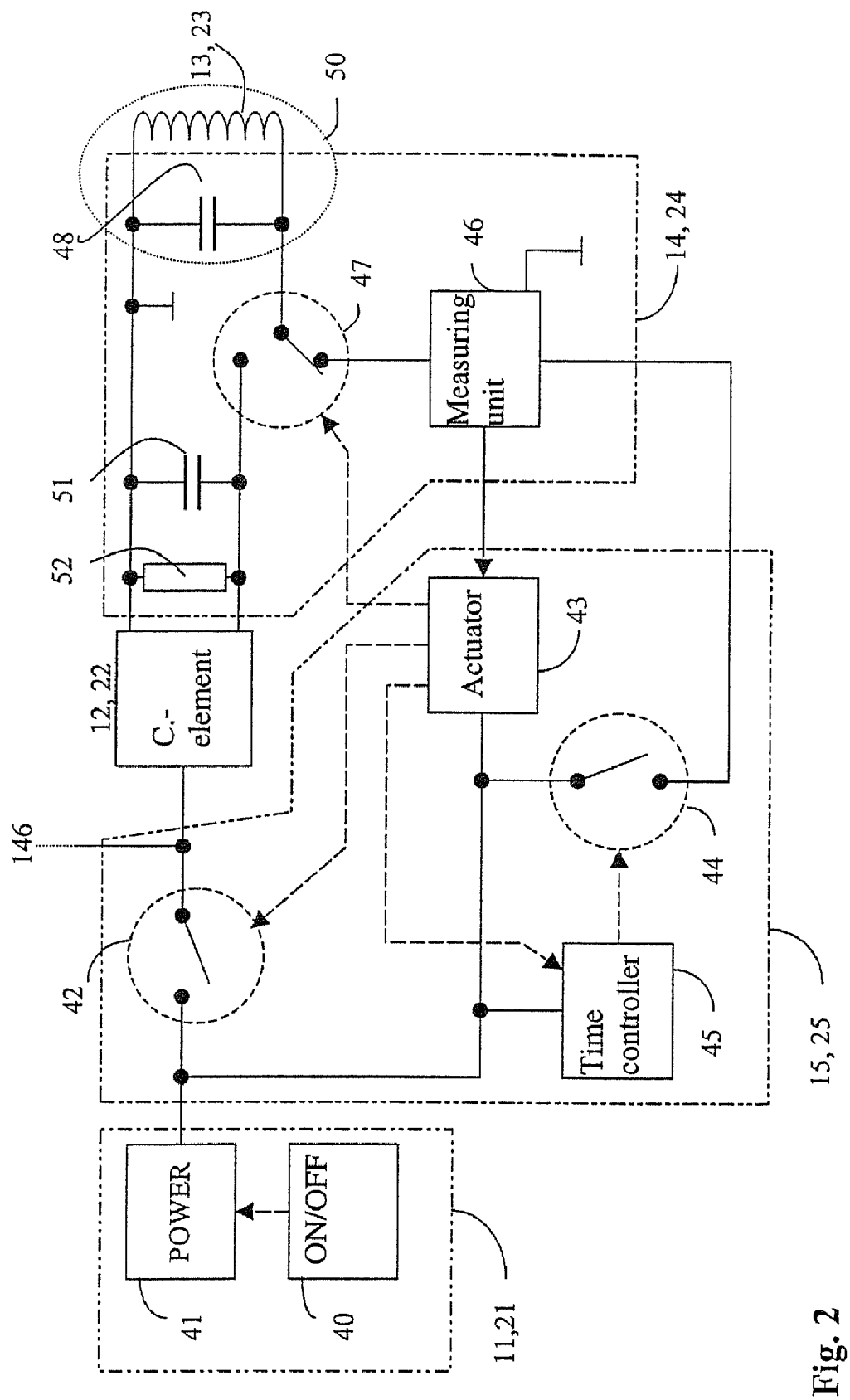
FIG. 2 shows a simplified equivalent circuit diagram of a communication apparatus.

FIG. 2 shows a simplified equivalent circuit diagram of a device 10, 20, 30. The data processing component 11, 21, and therefore the external appearance of the device 10, 20, is represented therein by an on/off switch 40 operable by a user for switching on and off the main energy supply 41 of the device 10, 20. The main energy supply 41 can be in particular a battery or an accumulator. Particularly a firmly installed reading device can also use a mains voltage as the main energy supply 41. The presence of the switch 40 depends on the form of the device; in certain embodiments, e.g. upon execution as a chip card 30, the switch 40 can be omitted. The device 30 is then either constantly on or is switched on by an equally acting mechanism adapted to the design.

The switching apparatus 15, 25 comprises two switches 42, 44 which are drivable by means of an actuator 43, as well as optionally a time controller 45. Actuator 43 and time controller 45 are connected to the main energy supply 41. The first switch 42 is placed between the main energy supply 41 and the communication element 12, 22, the second switch 44 between main energy supply 41 and measuring device 14, 25. The second switch 44 is actuated via the time controller 45 which is connected for this purpose to the actuator 43 and receives a switching signal therefrom. The first switch 42 can be used to switch on and off not only the communication element 12, 22 but also further components (not shown) of the particular device 10, 20, 30, as indicated by the connection 146. All components of the switching apparatus 15, 25 can be realized discretely, as circuits or also in the form of software programs. Actuator 43 and time controller 45 moreover expediently have a certain intelligence and are designed to execute software program routines.

The essential element of the measuring device 14, 24 is a measuring unit 46 which is switchable on and off by means of the switch 44 of the switching apparatus 15, 25. The measuring unit 46 is further connected to the actuator 43 of the switching apparatus 15, 25 as well as via a switch 47 to the coil 13, 23. The switch 47 is actuated by the actuator 43. It thereby connects the coil 13, 23 either to the measuring unit 46 or to the communication element 12, 22. The coil 13, 23 is furthermore connected to the communication element 12, 22. Like the switching apparatus 15, 25, the components of the measuring device 14, 24 can be realized discretely, as circuits or in the form of software programs. The measuring unit 46 is expediently likewise equipped with a certain intelligence and designed to execute software program routines. In embodiments of the device that are particularly restricted with regard to energy resources, e.g. upon execution in the form of a chip card 30, the measuring device can be omitted. The device 30 can then be detected by other devices 10, 20 but not detect other devices 10, 20, 30 itself.

Disposed in parallel with the coil 13, 23 is a capacitor 48 which forms together with the coil 13, 23 a transmission oscillator 50. The transmission oscillator 50 is connectable via the switch 47 to the communication element 12 or the measuring unit 46. In parallel with the transmission oscillator 50 but behind the switch 47 with respect to the transmission oscillator 50, a further capacitor 51 as well as a resistor 52 can be disposed. Both elements 51, 52 can be switched to the transmission oscillator 50 via the switch 47. The capacitor 51 causes a change in the resonant frequency of the transmission oscillator 50, the resistor 52 an increase in the bandwidth while simultaneously reducing the oscillating circuit quality factor. The mentioned passive components 47, 49, 51, 52 can be executed as discrete components but also in the form of assemblies with a corresponding external effect.

In an advantageous variant particularly suitable for devices 10, 20 with sufficient energy resources, the measuring unit 46 is formed as a frequency sweeper which sweeps the measuring frequency continuously over a predetermined frequency domain. The predetermined frequency domain comprises at least one frequency to which another device 10, 20, 30 is tuned.

Figure 3:
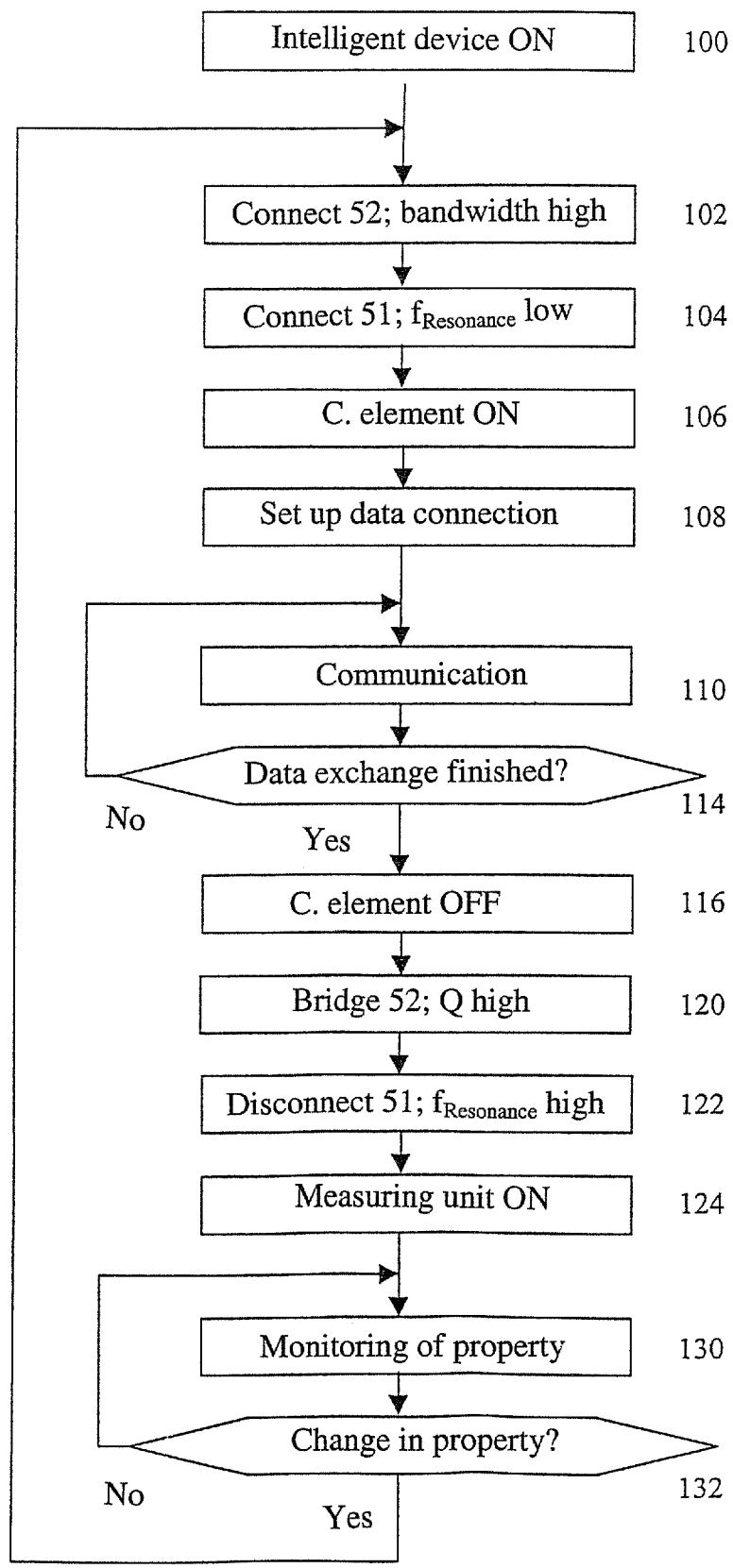
FIG. 3 shows a flow chart of the operation of a communication apparatus.

FIG. 3 illustrates a first possible operating mode of a device 10, 20, 30. In accordance with the equivalent circuit diagram rendered in FIG. 2, it optionally has a capacitor 51 as well as a resistor 52 to influence the transmission oscillator 50.

Operation starts by the device 10, 20, 30 being switched on, step 100, e.g. by means of a switch 40 which actuates the main energy supply 41. Said switching-on also switches on the actuator 43. The latter then sets the switch 47 so that the coil 13, 23, 33 is connected to the communication element 12, 22 via the switch 47. At the same time, the setting of the switch 47 causes the resistor 52, step 102, and the capacitor 51, if present, to be switched to the transmission oscillator 50, step 104.

Connection of the resistor 52 results in a worsening of the quality factor Q of the transmission oscillator 50, but at the same time causes an increase in the bandwidth B available for a data transmission in the transmission oscillator 50, since it applies to the relation between quality factor Q and bandwidth B that B≈1/Q.

Connection of the capacitor 51 reduces the resonant frequency of the transmission oscillator 50 and sets it to a transmission frequency suitable for a data transmission, e.g. 13.56 MHz. The change makes the subsequent data transmission and the operation of the communication apparatus 1, 2, 3 insensitive to interference by magnetic fields of devices 10, 20, 30 of the same kind located in the vicinity and working in the detection mode, i.e. at a higher resonant frequency.

Furthermore, the actuator 43 switches on the communication element 12, 22, step 106. The communication element 12, 22 thereby goes into the search mode and cyclically emits a search signal via the coil 13, 23, 33 to receive a response from another device 10, 20, 30 possibly located within the response range of the coil 13, 23, 33.

If another device 10, 20, 30 is located within the response range of the coil 13, 23, 33 it reacts to the search signal by returning a response, whereupon the communication element 12, 22 puts the communication apparatus 1, 2, 3 in the data transmission mode. For this purpose, it sets up a data connection with the data processing component 11, 21, 31 of the answering device 10, 20, 30 using a suitable protocol, e.g. the above-mentioned protocols (NFC, 14443, . . . ), step 108.

After the data connection is set up, the data processing component 11, 21, 31 conducts a data exchange via the coil 13, 23, 33 in the known way with the corresponding data processing component 11, 21, 31 of the device 10, 20, 30 present, step 110.

The actuator 43 waits until the data exchange between the data processing components 11, 21, 31 of the devices 10, 20, 30 involved is completed, step 114. Detection that the data exchange is finished can be effected by reception of a corresponding signal from the data processing component 11 or the communication element 12 or also by cyclical execution of a check step in the actuator 43 itself. The communication element 12, 22 can be connected to the time controller 45 and the actuator 43 independently of the switch 42.

When the data exchange is finished, the actuator 42 puts the communication device 1, 2, 3 in the detection mode.

For this purpose, the actuator 43 separates the communication element 12, 22 from the main energy supply 41 by shifting the switch 42, step 116.

Further, the actuator 43 actuates the switch 47 and connects the measuring unit 46 to the transmission oscillator 50. The switch actuation further causes the resistor 52 and optionally the capacitor 51 to be switched out of the transmission oscillator 50 again, step 120, 122. Removal of the resistor 52 brings about in the transmission oscillator 50 an unloaded quality factor $Q_0$ which is determined in the ideal case only by the inductance of the coil 13, 23, 33, the oscillating circuit capacitor 48 and the input resistance of the coil 13, 23, 33. In accordance with the improved quality factor $Q_0$ the detection range increases in which other devices 10, 20, 30 present are detected in the detection mode.

The possible switching off of a capacitor 51 permits the frequency of the oscillating circuit 50 and thus the measuring frequency of the measuring unit 46 to be optionally increased and set e.g. in the range of 13.56 to 17 MHz. This has the consequence that the measuring unit 46 is not, or not as strongly, influenced by other intelligent devices located in the close vicinity and in the communication mode (i.e. transmit mode). Since signals of other reading devices could otherwise be misunderstood as the approach of an intelligent device, the obtained reduction of the detection of signals of other reading devices is advantageous. Likewise, any other devices 10, 20, 30 located in the vicinity which are in the data transmission mode are thus not disturbed during operation in the detection mode.

Further, the actuator 43 switches on the measuring unit 46 by actuating the switch 44 for producing the detection mode, step 124.

The measuring unit 46 then monitors a property of the transmission oscillator 50. For example, it monitors the frequency tuned in the transmission oscillator 50 while the latter is operated in resonance. If in this state the coil 13, 23, 33 of another device 10, 20, 30 is brought into the detection range of the coil 13, 23, 33, this causes a change of resonant frequency in the transmission oscillator 50, which is detected by the measuring unit 46, step 132. Alternatively, it is also possible to evaluate/measure the impedance of the transmitting oscillator 50 operated in resonance.

When the measuring unit 46 has detected a change in the observed oscillating circuit property, it transmits a corresponding control signal to the actuator 43, whereupon the actuator 43 executes the steps 102 ff. again and initiates the search or data transmission mode.

If the measuring device 46 allows sweeping of the oscillating circuit frequency, monitoring of the oscillating circuit property is effected over the total frequency domain swept. The frequency domain swept contains at least the resonant frequency of one kind of device with which a data connection can be set up. If the resonant frequency of such a device 30 is e.g. 13.56 MHz, the sweep range can be for example between 13 and 18 MHz. If a change in the oscillating circuit property occurs at any frequency within the frequency domain swept, the measuring unit 46 transmits a control signal to the actuator 43 for executing the steps 102 ff.

Figure 4:
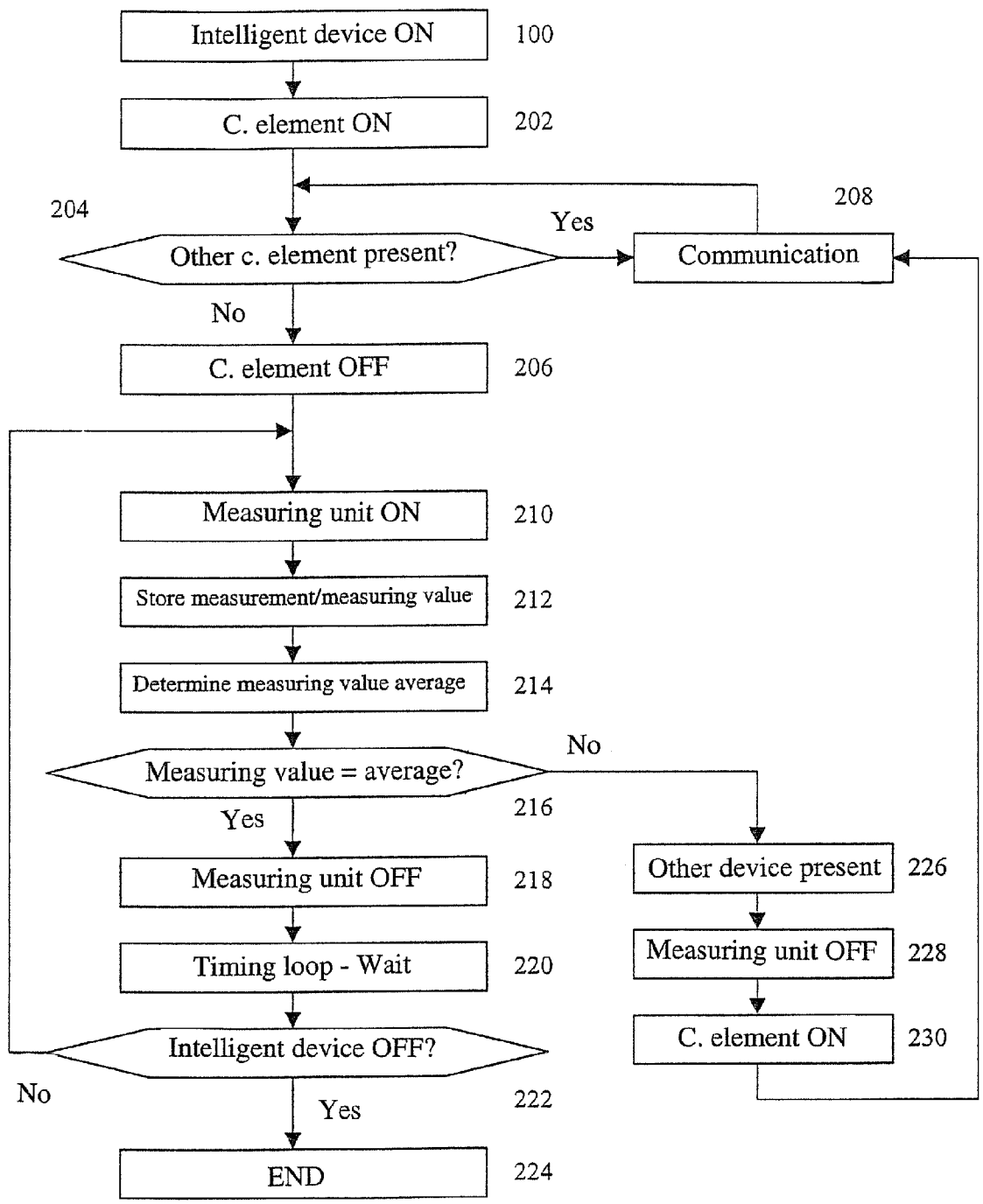
FIG. 4 shows a flow chart of the operation of a communication apparatus provided with a time controller.

FIG. 4 shows a variant for operating a communication apparatus built up according to FIG. 2. The operating variant can be designed as an alternative or also in addition to the operating mode illustrated in FIG. 3. The operating variant shown in FIG. 4 presupposes that the device 10, 20, 30 has a time controller 45 as indicated in FIG. 2.

Operation again starts by the device 10, 20 being switched on, step 100, e.g. by switching on the main energy supply 41 by means of a switch 40.

The communication apparatus 1, 2, 3 thereupon first goes into the search mode. For this purpose, the actuator 43 switches on the communication element 12, 22, step 202, which subsequently checks by cyclically outputting search signals whether another device 10, 20, 30 is located within the response range of the coil 13, 23, 33, step 204.

If the outputting of the search signal in step 204 is followed by a response from another device 10, 20, 30 present, the communication apparatus 1, 2, 3 changes to the data transmission mode after set-up of a data connection with the other device 10, 20, 30, and conducts a data exchange with the detected device 10, 20, 30, step 208.

If the search signal is not followed by a response, the actuator 43 switches off the communication element 12, 22 again, step 206.

Further, the actuator 43 activates the time controller 45 which thereupon switches on the measuring unit 46 in cyclical switch on and off operation for a predetermined time by driving the switch 44 accordingly, step 210. The measuring unit 46 then performs a measurement of the monitored oscillating circuit property and stores the measuring value, step 212. From all hitherto determined and stored measuring values it subsequently forms a measuring value average, step 214.

It compares the measuring value obtained in step 212 with the determined measuring value average, step 216. If the measuring value corresponds to the average, no other device 10, 20, 30 is located within the detection range of the transmission oscillator 50. The measuring unit 46 then performs no further function and is switched off by the action of the time controller 45, step 218. The measuring unit 46 subsequently remains off, while the time controller 45 waits for the expiration of a predetermined off time, step 220. The off time is expediently selected to be greater than the on time in which the measuring unit 46 performs the measurement.

During the waiting period the device 10, 20 can be switched off as a whole, e.g. by actuating the switch 40, step 222. When this case occurs, the working sequence ends, step 224.

If the predetermined off time expires without the device being switched off as a whole, the time controller 45 switches on the measuring unit 46 again by actuating the switch 44 and repeats the steps 210 ff.

If the check in step 216 yields that a measuring value found does not correspond to the determined measuring value average, another device 10, 20, 30 is located within the detection range of the oscillating circuit 50, step 226. The measuring unit 46 then transmits a corresponding control signal to the actuator 43, whereupon the actuator 43 puts the communication apparatus 1, 2, 3 in the search mode. For this purpose, it switches off the measuring unit 46 by actuating the switch 44, step 228, and switches on the communication element 12, 22 by actuating the switch 42, step 230.

The communication element 12, 22 then produces the data transmission mode, as described, in which the data exchange is then effected between the data processing components 11, 21 of the devices involved, step 208.

Figure 5:
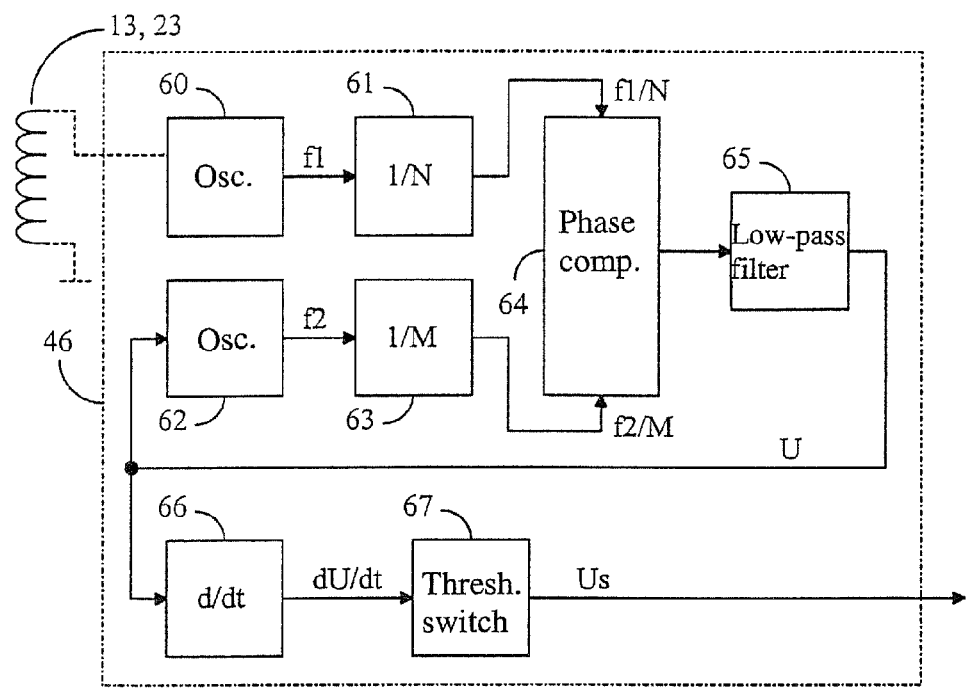
FIG. 5 shows a first embodiment of a circuit implementation of the measuring unit by means of a PLL circuit.

FIG. 5 shows a first embodiment of a circuit implementation of the measuring unit 46 by means of a PLL circuit. PLL stands for "phase locked loop" and means that a signal with a frequency is set relative to a signal with a reference frequency so exactly that the phase relation between the signals is permanently maintained. The first embodiment of the measuring unit 46 has a first oscillator 60 which produces a signal with a frequency f1 and feeds it to a first frequency divider 61, which can be formed as an integer or binary divider and performs a frequency division with a division factor N. It is indicated by dashed lines that the coil 13, 23 is connected to the first oscillator 60. The connection can be effected in the way shown in FIG. 2 via the switch 47 and a common ground. The exact execution depends on the circuit design of the oscillator circuit used, as well as the circuit design of the communication element 12, 22 (transmitter final stage). Thus, oscillator circuits are known, e.g. Colpitts, in which a connection of the coil 13, 23 can be grounded (on the alternating voltage side). In this case, the switch 47 can be executed so that only one connection of the coil must be switched over to the measuring unit 46, as shown in FIG. 2 for example.

In another embodiment of the oscillator circuit 60, it can also be required that a second connection of the coil is connected not to ground but to the supply voltage (e.g. Colpitts circuit variant). In this case, a second switch 47b (not shown) may be necessary.

Likewise, oscillator circuits are known in which two connections of the coil must be connected to the oscillator circuit 60. In this case, too, an additional switch 47b (not shown) is required for switching over the coil 13, 23 between the measuring unit 46 and the communication element 12, 22.

The connection likewise shown in FIG. 2 of the measuring unit 46 to the switch 44 for switching the measuring unit 46 on and off is not shown in FIG. 5, since the energy supply of the individual components of the measuring unit 46 is omitted in FIG. 5 for reasons of clarity.

The measuring unit 46 further has a second oscillator 62 which feeds a signal with a frequency f2 to a second frequency divider 63 which performs a frequency division with a division factor M. The second frequency divider 63 is formed according to the first frequency divider 61 and connected on the output side to an input of a phase comparator 64. A further input of the phase comparator 64 has connected thereto the first frequency divider 61 with its output. The phase comparator 64 is followed by a low-pass filter 65 which feeds a voltage U both to an input of the second oscillator 62 and to an input of a voltage differentiator 66. The voltage differentiator 66 is connected on the output side to an input of a threshold switch 67 which supplies at its output a switching voltage Us for the actuator 43 shown in FIG. 2. The components 60, 61, 62, 63, 64 and 65 of the measuring unit 46 form a modified PLL circuit whose operation will be explained more closely hereinafter in connection with the further components 66 and 67.

The first oscillator 60 is formed as an LC oscillator, the coil 13, 23 being used as the frequency-fixing inductor L. By suitable dimensioning of a frequency-fixing capacitor C the first oscillator 60 is so adjusted that it begins oscillating at the transmitting frequency used in the detection mode when another device 10, 20, 30 is absent. Optionally, the capacitor 51 can be used to employ a higher frequency. The first frequency divider 61 divides the frequency f1 of the signal produced by the first oscillator 60 using the division factor N, thereby producing a signal with a frequency f1/N. Since frequency division is advantageous but not compulsory, the first frequency divider 61 can also be omitted or have a division factor N=1.

The second oscillator 62 is formed as a voltage-controlled oscillator, so that the frequency f2 of the signal produced by the second oscillator 62 depends on the fed voltage U. The signal with the frequency f2 is converted by the second frequency divider 63 to a signal with a frequency f2/M. Like the first frequency divider 61, the second frequency divider 63 can also be omitted or have a division factor M=1. The signals output by the frequency dividers 61 and 63 are supplied to the phase comparator 64 which compares them with each other and outputs a signal dependent on the phase shift to the low-pass filter 65. The low-pass filter 65 suppresses the high-frequency signal components so that the voltage U output by the low-pass filter 65 is suitable as a control voltage for the second oscillator 62. Through the control properties of the PLL circuit, the frequency f2 of the second oscillator 62 is automatically so adjusted that a value f2=f1*M/N results and the two oscillators 60 and 62 are coupled in phase lock.

In an advantageous embodiment, a division factor of N>1 is provided for the first frequency divider 61, and a division factor M=1 for the second frequency divider 63. This results in the second oscillator 62 being operated at a lower frequency than the first oscillator 60 and thus not being able to disturb the operation of the device 10, 20, 30 by its own signal. For example, the second oscillator 62 can be operated at a frequency f2 of 6.78 MHz for N=2. It is also particularly favorable if the division factors N and M of the frequency dividers 61 and 63 have a non-integral relationship to each other, e.g. M/N=5/6. This permits the frequency f2 of the second oscillator 62 to be selected so that no same-frequency interference having an especially negative effect is to be feared through any harmonic waves of the second frequency f2 and a parasitical irradiation of the second oscillator 62 into the coil 13, 23. It is irrelevant here whether the ratio M/N is selected to be smaller or greater than one.

When the measuring unit 46 is in the adjusted state, i.e. there is phase-locked agreement between the signals of the two frequency dividers 61 and 63, a constant value comes about for the voltage U output by the low-pass filter 65. When another device 10, 20, 30 approaches the coil 13, 23, the influence of the inductively coupled-in impedance of the other device 10, 20, 30 leads to a change of the phase and optionally the frequency of the first oscillator 60 and thus to a phase shift between the two input signals of the phase comparator 64. This leads to a change of the voltage U output by the low-pass filter 65 and thus to a change of the frequency f2 and the phase of the signal produced by the second oscillator 62 until the signals produced by the two oscillators 60 and 62 are coupled in phase lock again. The readjustment of the frequency f2 of the second oscillator 62 performed in this way and the associated detection of the presence of another device 10, 20, 30 will be explained more closely with reference to FIG. 6.

Figure 6:
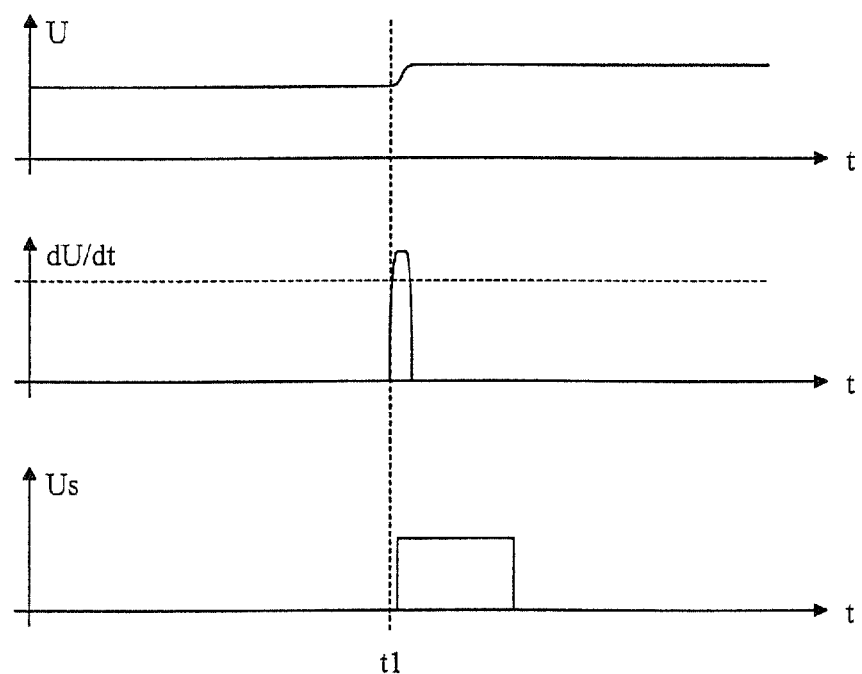
FIG. 6 shows a plurality of signal patterns within the measuring unit upon the approach of another device.

FIG. 6 shows a plurality of signal patterns within the measuring unit 46 upon the approach of another device 10, 20, 30. For all signal patterns the time t is plotted on the abscissa with the same scaling in each case so as to permit a direct comparison of the signal patterns. The upper diagram in FIG. 6 shows the time behavior of the voltage U output by the low-pass filter 65, i.e. the voltage U is plotted on the ordinate. In the middle diagram the temporal change of the voltage dU/dt is plotted on the ordinate, which is determined by the voltage differentiator 66 and output to the threshold switch 67. In the lower diagram the switching voltage Us produced by the threshold switch 67 is plotted on the ordinate.

Figure 8:
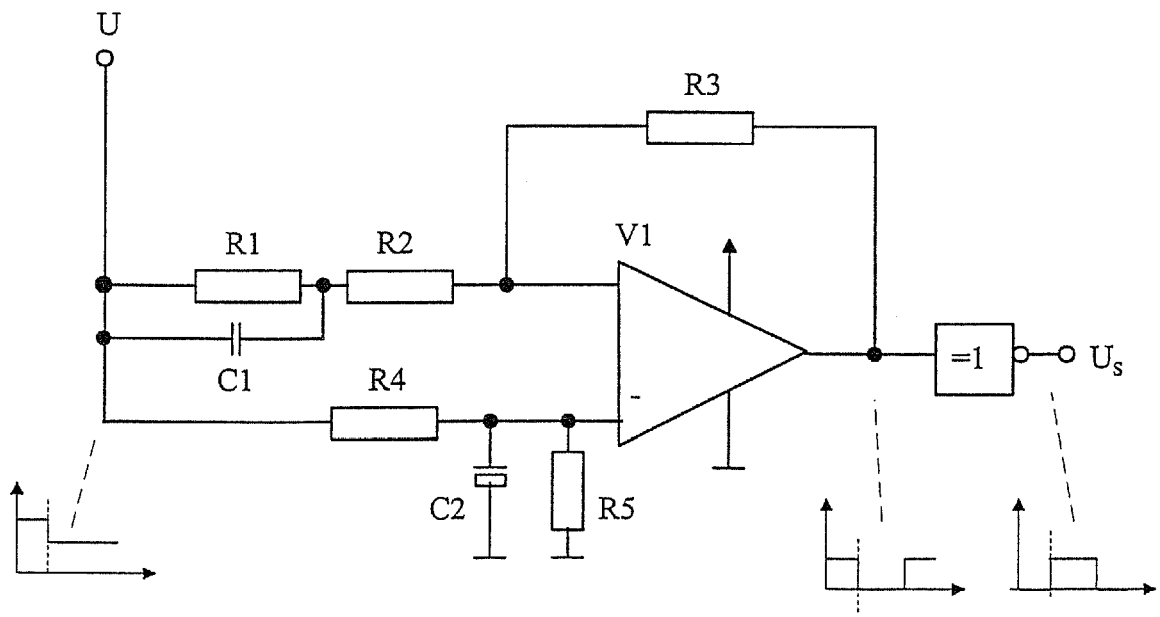
FIG. 8 shows a circuit implementation of the functional blocks, voltage differentiator and threshold switch, from FIG. 5 or 7.

One possibility for designing the functional blocks 66, 67 is shown in FIG. 8.

A low-pass filter is formed here by R4, R5, C2, whereby an average of a partial voltage of U comes about with a large time constant (e.g. 1 s) at the (−) input of an amplifier V1. Likewise, a partial voltage of U comes about at the (+) input of the amplifier V1 via R1, R2, R3.

When the voltage U e.g. quickly drops upon the approach of a coil 13, 23, 33, the voltage at the (+) input momentarily drops below the voltage at the (−) input, thus producing a switching signal Us until the voltage at the (−) input has adjusted to the new (average) value.

The voltage U can rise or also fall upon the approach of a coil 13, 23, 33. The exact behavior depends on the circuit used (FIG. 5, FIG. 7) and the practical execution thereof.

The approach of another device as of the time t=t1 results in the above-mentioned change of the hitherto constant voltage U of the low-pass filter 65. This is expressed in the upper diagram of FIG. 6 in an abrupt increase in the voltage U, which subsequently remains at a higher level. Since the value by which the voltage U changes can be relatively small, the voltage U itself is not used for driving the threshold switch 67, but rather the temporal change thereof dU/dt. As indicated by the middle diagram, the temporal change of the voltage dU/dt has a very pronounced maximum immediately after the time t=t1, which is well-suited for further processing. This maximum exceeds the response threshold of the threshold switch 67, which is shown by a dashed horizontal line. This has the consequence that the threshold switch 67 responds and produces the square pulse shown in the lower diagram. Because of the finite gradient with which the voltage U rises and the time for signal processing required by the threshold switch 67, the square pulse of the switching voltage Us starts at a slight time delay after the time t=t1. The square pulse is output by the measuring unit 46 to the actuator 43 for further processing.

Figure 7:
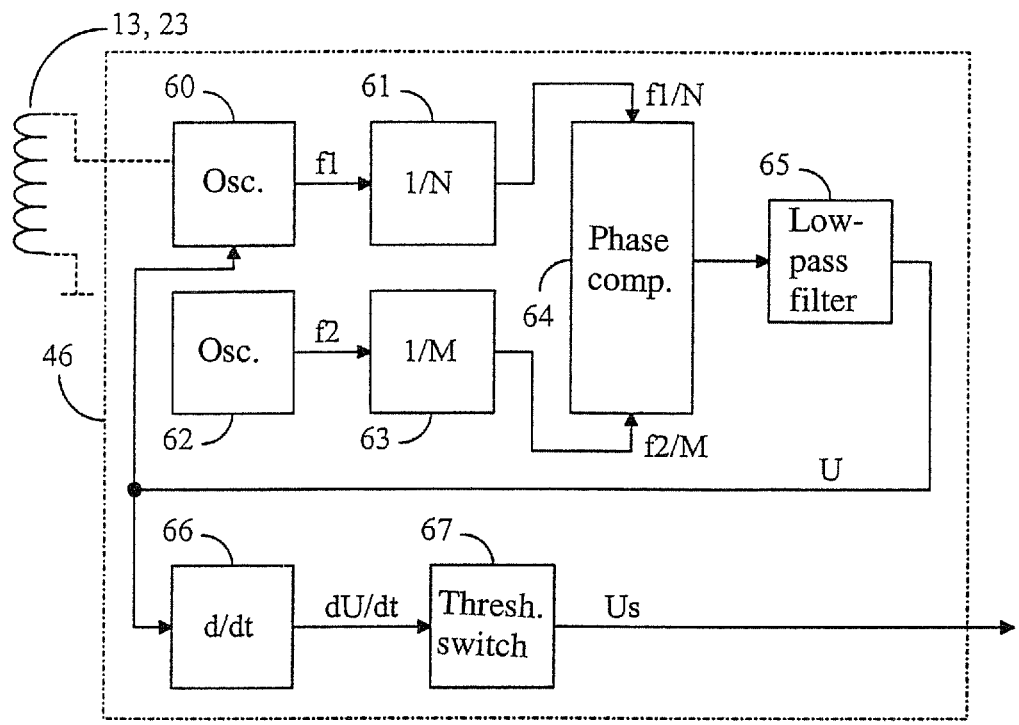
FIG. 7 shows a second embodiment of a circuit implementation of the measuring unit by means of a PLL circuit.

FIG. 7 shows a second embodiment for a circuit implementation of the measuring unit 46 by means of a PLL circuit. The structure corresponds largely to the first embodiment. However, unlike the first embodiment of the measuring unit 46, the second oscillator 62 is not executed as a voltage-controlled oscillator but as a stable-frequency quartz oscillator. The first oscillator 60 is now executed as a voltage-controlled LC oscillator. Adjustment of the frequency f1 is effected here via a voltage-dependent capacitance which, together with the inductance of the coil 13, 23, determines the frequency f1 of the first oscillator 60. Due to the different formation of the oscillators 60 and 62, the circuitry of the individual components of the measuring unit 46 is changed to the effect that the output of the low-pass filter 65 is connected to an input of the first oscillator 60. The second oscillator 62 does not receive an input signal. The changed structure results for the second embodiment of the measuring unit in the following operation.

Using an analogous control mechanism as described for the first embodiment, the frequency f1 of the first oscillator 60 is adjusted to a constant value which is fixed by the frequency f2 of the second oscillator 62 and the division factors N and M of the frequency dividers 61 and 63. By accordingly selecting the frequency f2 and the division factors N and M it is in particular possible to operate the first oscillator 60 constantly at a frequency f1 corresponding to the transmitting frequency used in the detection mode. Upon the approach of another device 10, 20, 30, the frequency f1 of the first oscillator 60 does not change despite the inductively coupled-in impedance. Nevertheless, a detectable change occurs in the voltage U upon the approach of another device 10, 20, 30, since the first oscillator 60 is readjusted with the help of the voltage U, thereby compensating the detuning of the first oscillator 60. On the basis of the voltage U a drive signal for the actuator 43 is produced in the above-described way.

According to FIG. 2, the measuring unit 46 and the communication element 12, 22 are executed as independent circuit components. The thus required switch 47 which switches over the coil 13, 23 between the measuring unit 46 and the communication element 12, 22 must be designed for high voltages and performances. Due to the voltage overshoot in resonance, very high RF voltages, occasionally even in the range of a few 100 V, can occur on the coil 13, 23. The required large-signal stable signal switchover can be realized in some cases only with an elaborate and expensive circuit, depending on the transmit power. In a variation of the invention, it is therefore provided that the final stage of the communication element, which is preferably formed as a transistor circuit, is also used as the first oscillator 60 or the second oscillator 62 by a suitable switchover of operating point, amplification and the feedback of the output signal. Such a final stage already tends to oscillate upon a corresponding feedback.

The measuring unit 46 has high responsivity, since even extremely small phase changes can be detected. Upon corresponding dimensioning of the measuring unit 46 and the coil 13, 23, other devices 10, 20, 30 can be detected even over a large distance of up to a few meters. This makes it possible, for example, to use the measuring unit 46 for theft protection of articles of sale. In this case, it is provided to use the switching voltage Us produced by the threshold switch 67 to trigger an alarm signal. The articles of sale can be provided for example with RF labels which have an oscillating circuit without a chip and are typically intended for a frequency domain of 8.2 MHz. Likewise, acoustomagnetic labels can also be used, the typical frequency domain then being below 60 kHz.

While retaining the basic idea of switching on a communication element that automatically sets up a data connection with a corresponding communication element of the same kind, only when the presence of such a corresponding communication element has already been ascertained, the above-described concept allows a number of embodiments. Thus, the structure of the intelligent devices 10, 20, 30 can deviate from that described here while having exactly the same functionality. Above all, the stated components can be replaced by other assemblies or circuits that act accordingly. Also, the breakdown of the intelligent devices and communication elements, switching apparatus, measuring device and data processing component selected for the description is arbitrary and can be done differently without affecting the functionality. In particular, the functionalities of actuator 43, time controller 45 and measuring unit 46 can be realized completely or partly in software form in the central processor unit of the device 10, 20, 30. Within limits, a simplified execution of the above-described invention is also conceivable. For example, the changing of the resonant frequency in the transmission oscillator 50 in the search mode and thus the necessity of providing the capacitor 51 can be omitted.

The invention claimed is:

1. A communication apparatus for setting up a data connection between intelligent devices, comprising:

a transmission oscillator for carrying out a contactless data exchange, said oscillator including a coil;

a communication element which is connected to the coil and to a data processing component of an intelligent device and which emits search signals via the coil to receive a response from another intelligent device, a measuring device for monitoring a property of the transmission oscillator which outputs a control signal when ascertaining a change of the monitored property, the monitored property of the transmission oscillator includes the frequency or impedance of the transmission oscillator in resonance, and a switching apparatus which is connected to the measuring device and the communication element and which switches on the communication element when it has received the control signal from the measuring device by connecting the communication element to an energy source.

2. The communication apparatus according to claim 1, including an assembly that is switchable to the transmission oscillator via a switch, said assembly causing an increase in the bandwidth of the oscillating circuit.

3. The communication apparatus according to claim 2, wherein the assembly is a resistive element.

4. The communication apparatus according to claim 1, including an assembly switchable to the transmission oscillator via a switch, said assembly causing a change in the resonant frequency of the transmission oscillator.

5. The communication apparatus according to claim 4, wherein the assembly is arranged to enable a reduction in the resonant frequency.

6. The communication apparatus according to claim 4, wherein the assembly comprises a capacitor.

7. The communication apparatus according to claim 1, wherein the measuring frequency of the measuring device is sweepable over a predetermined frequency domain.

8. The communication apparatus according to claim 1, wherein the switching apparatus has a time controller for cyclically switching the measuring device on and off.

9. The communication apparatus according to claim 8, wherein the time controller keeps the on state of the measuring device shorter than the off state.

10. The communication apparatus according to claim 8, wherein the measuring device stores a measuring value obtained during a cyclical on phase.

11. The communication apparatus according to claim 10, wherein the measuring device emits a control signal to the switching apparatus when a measuring value deviates from the average of the measuring values stored with the previous on phases.

12. The communication apparatus according to claim 8, wherein, when the intelligent device is switched on, the communication element is initially on and the measuring device off.

13. The communication apparatus according to claim 1, wherein the measuring device has a first oscillator device coupled at least temporarily with the coil, for producing a first oscillation signal, and a second oscillator device for producing a second oscillation signal.

14. The communication apparatus according to claim 13, wherein the measuring device has circuit components for producing the control signal for the switching apparatus on the basis of a phase relation between the first and second oscillation signals or signals derived therefrom.

15. A method for switching on a communication element configured to use a coil, which is part of a transmission oscillator, for automatically setting up a data connection with an intelligent device likewise having a communication element and a coil, comprising the following steps:
- monitoring a property of the transmission oscillator by means of a measuring device, wherein the property of the transmission oscillator includes the frequency or impedance of the transmission oscillator in resonance,
- producing a control signal upon the occurrence of a change in the monitored property,
- switching on the communication element by a switching apparatus in response to the control signal by connecting the communication element to an energy source.

16. The method according to claim 15, wherein the measuring frequency of the measuring unit is swept over a given frequency domain during the monitoring of the property.

17. The communication apparatus according to claim 1, including an assembly switchable to the transmission oscillator via a switch, said assembly causing a change in the resonant frequency of the transmission oscillator, when the measuring device has ascertained a change of the monitored property and outputted the control signal.

* * * * *